United States Patent
Ankeny

[15] 3,665,814
[45] May 30, 1972

[54] HYDRAULIC MOTOR CONTROL

[72] Inventor: Jay H. Ankeny, West Des Moines, Iowa

[73] Assignee: Delavan Manufacturing Company

[22] Filed: Aug. 20, 1970

[21] Appl. No.: 65,636

[52] U.S. Cl. .................................92/71, 60/53 A, 91/473
[51] Int. Cl. .................................................F01b 3/00
[58] Field of Search .............92/71, 70; 60/53 A; 91/473, 91/506; 417/222, 218

[56] References Cited

UNITED STATES PATENTS

| | | | |
|---|---|---|---|
| 2,392,980 | 1/1946 | Fawkes | 92/71 X |
| 3,163,987 | 1/1965 | Dowty et al. | 60/53 A |
| 3,209,538 | 10/1965 | Kuze | 60/53 A |
| 3,238,724 | 3/1966 | Miller | 60/53 A |
| 3,319,419 | 5/1967 | Hann | 60/53 A |
| 3,364,679 | 1/1968 | Osojnak | 60/53 A |
| 3,411,297 | 11/1968 | Hann | 60/53 A |
| 3,463,087 | 8/1969 | Grant | 60/53 A |
| 3,523,419 | 8/1970 | Hindle | 60/53 A |

Primary Examiner—Martin P. Schwadron
Assistant Examiner—Leslie J. Payne
Attorney—Molinare, Allegretti, Newitt & Witcoff

[57] ABSTRACT

A hydraulic motor control wherein the cam plate of a hydraulic motor is selectively tilted by a hydraulic control piston which communicates with the high pressure fluid supply conduit of the motor. When the motor load is increased, the control piston will increase the tilt of the cam plate in response to an increase in the fluid pressure in the supply conduit and the torque of the motor will increase by an amount substantially greater than the increase in the fluid pressure in the supply conduit.

2 Claims, 2 Drawing Figures

Patented May 30, 1972 3,665,814

INVENTOR.
JAY H. ANKENY
BY Molinare, Allegretti,
Newitt & Witcoff
ATTORNEYS

3,665,814

HYDRAULIC MOTOR CONTROL

BACKGROUND AND SUMMARY OF THE INVENTION

This invention relates to hydraulic motor control and, more particularly, to hydraulic motor control in which the torque of the motor may be automatically increased as the load on the motor increases.

It is both advantageous and desirable to increase the torque of motors, such as hydraulic motors, when the load on the motor is increased. Such increase in torque reduces the likelihood of stalling of the motor and makes it possible to operate given sized motors under loads of substantial magnitude. In the usual hydraulic system, if the torque is to be increased by a given amount, the line pressure must also be increased by essentially the same amount for a given tilt of the cam plate of the motor, hence a given displacement of the motor. Thus, if the torque of such motors is to be doubled during operation, the pressure of the high pressure supply fluid must also be substantially doubled. Such increased torque requirements are frequently encountered on start-up, for example, where the required torque may be as much as twice the torque needed during running. Due to the presence of these elevated pressures, the components of the hydraulic systems in the past had to be designed to accommodate these pressures, even though such pressures only occur for brief periods of time. Such component design adds to the system weight as well as expense.

In accordance with the principles of the invention, the torque of an axial piston hydraulic motor may be automatically increased in response to an increase in the load on the motor. In a motor control incorporating the principles of the invention, a hydraulic control piston may be provided which selectively tilts the cam plate of the motor so as to vary the stroke length of the working pistons of the motor. In accordance with the principles of the invention, a cam plate control piston is hydraulically connected to the high pressure fluid supply line of the motor and, when the load on the motor is increased, the control piston will be actuated so as to simultaneously and automatically increase the torque of the motor. The motor control incorporating the principles of the invention is capable of simply, reliably and inexpensively controlling the torque of a hydraulic motor over a wide range of loads and the cost and weight of the system components may be substantially reduced over those systems which had to be designed to accommodate hydraulic pressure increases which change by substantially the same magnitude as the torque requirements of the motor. In the motor control of the invention, the torque of a hydraulic motor may be increased automatically upon increasing the load on the motor and the magnitude of this torque increase may be substantially greater than the increase in the pressure in the high pressure fluid supply. As a result, given torque increases may be realized with substantially lower fluid supply pressures when practicing the teachings of the invention.

In a hydraulic circuit which incorporates the principles of the invention, a hydraulic motor having working pistons, and fluid supply means for supplying the pistons with working fluid under pressure are provided. A cam plate is also angularly positioned in the pump and cam plate angle varying means selectively varies the angle of the cam plate to vary the length of reciprocation of the pistons. Motor control means is included in the circuit which changes the torque of the motor when the load changes. The motor control means includes means which communicate the supply means with the cam plate angle varying means such that the varying means will vary the tilt of the cam plate and the torque of the motor in response to changes in the pressure of the working fluid, increasing the torque when the load on the motor is increased.

These and other objects, features, and advantages of the present invention will be more clearly understood through a consideration of the following detailed description.

BRIEF DESCRIPTION OF THE DRAWING

In the course of this description reference will frequently be made to the attached drawing in which.

DESCRIPTION OF THE PREFERRED EMBODIMENT

Figure 1:
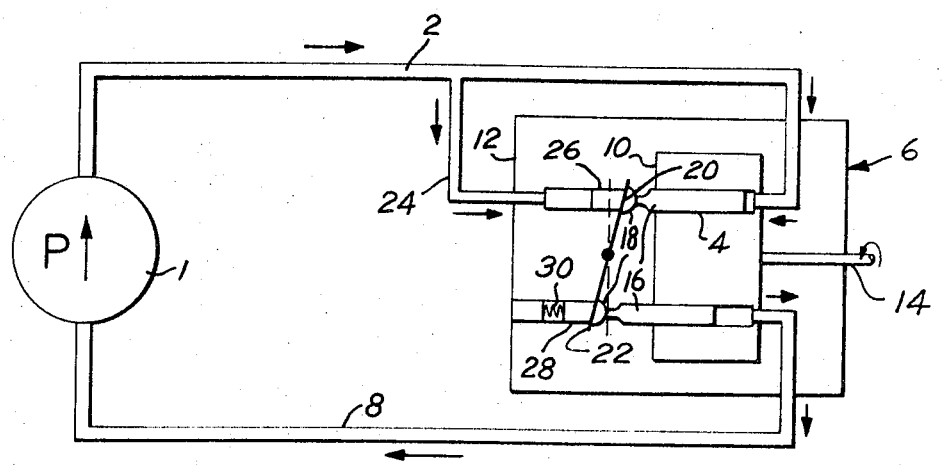
FIG. 1 is a schematic diagram of a hydraulic circuit incorporating a preferred motor control of the invention.

As shown in FIG. 1, a closed hydraulic circuit comprises a fluid pump 1 for elevating the fluid pressure in the circuit. The pump discharges to a high pressure fluid supply conduit 2 which communicates with the working cylinders 4 of, in this instance, an axial piston hydraulic motor 6. A low pressure return line 8 returns the hydraulic fluid to the inlet of the pump 1 after it is exhausted from the motor.

Such motors conventionally include a rotor 10 which rotates in a housing 12 and which drives the rotatable motor drive shaft 14. In the rotor are an odd numbered plurality of the cylinders 4 each of which includes a piston 16 which reciprocates in the working cylinders. Each of the pistons 16, by way of suitable ball and socket ends 18, bear against the cam surface 20 of a tiltable cam plate 22. Since the cam surface 20 assumes an angular position relative to the rotor 10, the pistons will be reciprocated back and forth in the cylinders 4 as the rotor rotates, such being conventional in axial piston devices. The reciprocation length of the pistons may be varied by varying the angular tilt of the cam plate 22.

In the operation of such axial piston motors as thus far described, as the high pressure fluid is delivered to the upper ones of the pistons 16, as viewed in the drawing, a force will be exerted on the pistons. Since the pistons contact the cam plate 22, the rotor will be caused to rotate so long as the cam plate is tilted from the dotted line position shown in FIG. 1. As the rotor rotates, the upper cylinders will be rotated to the bottom in the drawing and these cylinders, which previously communicated by way of conventional arcuate ports (not shown) to the high pressure conduit 2, will now communicate with the discharge line 8 which is connected to the suction side of the pump also by way of arcuate ports as is conventional in such motors.

Figure 2:
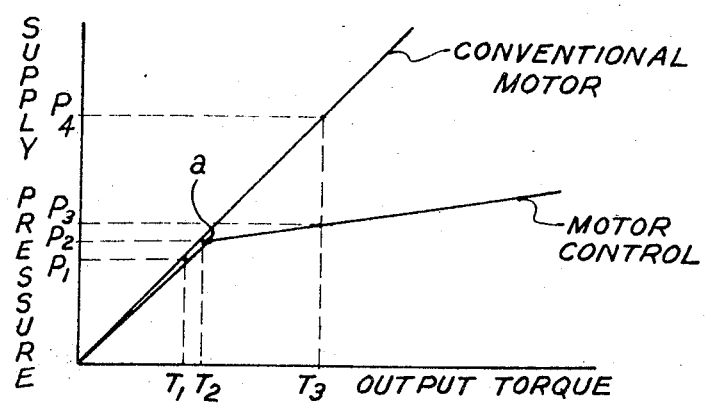
FIG. 2 is a plot of hydraulic supply pressure vs. output torque and showing the variation of output torque in both a conventional motor and one incorporating the principles of the invention.

Thus, referring to FIG. 2, rotation of the rotor will cause a given torque $T_1$ to be produced on the drive shaft at a given rotor speed and given pressure $P_1$ in supply conduit 2. Now, if the load on the motor is increased, a larger torque will be required. In the invention, when the load is increased this torque increase is effected both automatically and simultaneously and with only an accompanying fractional increase in the pressure in conduit 2 by way of a line 24 which communicates the pressure fluid in supply line 2 with a hydraulic cam plate tilt control piston 26. In the invention, as the load is increased on shaft 14, an incremental increase in pressure in conduit 2 will occur. This greater pressure will now be exerted on piston 26 so as to tend to further tilt the cam plate 20 in the clockwise direction as viewed in FIG. 1, increasing the displacement of the motor and the torque. A piston 28 also is positioned to exert a tilting force on the cam in a direction opposite to the force exerted by control piston 26. This piston is preferably preloaded by a spring 30 such that torque requirements below a predetermined amount are accomplished essentially by way of a pressure increase in conduit 2 as in conventional motor assemblies. However, if torque requirements exceed this predetermined amount, they are met by progressive tilting of the cam plate under the action of control piston 26. Thus, excessive increases in torque requirements, such as are encountered during motor start-up for example, are met with only a small fractional increase in the pressure in supply conduit 2.

Referring again to FIG. 2, if the torque requirements of the motor increase only minimally from torque $T_1$ to $T_2$, torque $T_2$ still being below the setting of the preload spring 30 as shown at a, the pressure in conduit 2 will increase proportionally to $P_2$ to meet the increased need. However, if the torque requirements of the motor increase substantially, for example if the requirement doubles from torque $T_1$ to $T_3$, the predetermined setting of a preload spring 30 will be exceeded and the torque requirement $T_3$ will be met as a result of the action of control piston 26 with only a fractional increase to $P_3$, for example on the order of 30 percent, in the pressure in conduit 2, rather than the approximate doubling of the pressure to $P_4$ which would otherwise occur in the conventional motor.

It will be understood that the preload piston may be adjusted to vary the preload setting as shown in FIG. 2 as desired.

It should also be understood that the embodiment of the invention which has been described is merely illustrative of one of the applications of the principles of the invention. Numerous modifications may be made by those skilled in the art without departing from the true spirit and scope of the invention.

What is claimed is:

1. In a hydraulic circuit, a hydraulic motor having working pistons which are reciprocal therein, fluid supply means for supplying said pistons with a working fluid under pressure, a cam plate which is angularly positioned relative to the axis of reciprocation of said pistons, and cam plate angle varying means including motor control means for selectively varying the angle of said cam plate to vary the length of reciprocation of said pistons and the torque of said motor when the load upon the motor is varied, wherein the improvement in said motor control means comprises in combination with said motor:

piston means which directly contacts said cam plate, fluid conduit means communicating said fluid supply means with said piston means such that said piston means continuously exerts a variable force on said cam plate during operation of said motor which varies in response to changes in pressure in said fluid supply means and in a direction which tends to vary the angular position of said cam plate toward its maximum angular position, and preload means which also directly contacts said cam plate and continuously exerts a force of predetermined magnitude on said cam plate in a direction which tends to vary the angular position of said cam plate to its minimum angular position, said predetermined magnitude being such that the angular position of said cam plate remains substantially unchanged for load increases on said motor below a given load during the operation of said motor, but wherein the force exerted by said preload means is substantially overcome and the angular position of said cam plate is increased for load increases on said motor above said given load, whereby the increase in the torque of said motor is substantially greater than the change in the pressure of the fluid in the fluid supply means when the load on the motor is increased above said given load than the increase in torque below said given load during the operation of said motor.

2. In the circuit of claim 1, wherein said fluid supply means includes a hydraulic pump and delivery conduit means and said cam plate angle varying means includes a hydraulic piston movable in response to variations in the pressure of the fluid in said delivery conduit means.

* * * * *